United States Patent [19]

Shibata et al.

[11] Patent Number: 4,985,054
[45] Date of Patent: Jan. 15, 1991

[54] FOAM-BURSTING DEVICE

[75] Inventors: Yoshihiko Shibata; Yoshihiro Chikamori; Youichi Shimizu, all of Okayama, Japan

[73] Assignee: W. L. Gore & Associates, Inc., Newark, Del.

[21] Appl. No.: 452,168

[22] Filed: Dec. 15, 1989

[30] Foreign Application Priority Data

Dec. 29, 1988 [JP] Japan .............................. 63-170958[U]

[51] Int. Cl.⁵ ............................................. B01D 19/02
[52] U.S. Cl. ........................................ 55/178; 55/267; 55/486; 55/528
[58] Field of Search ................... 55/267, 178, 158, 87, 55/16, 486, 528

[56] References Cited

FOREIGN PATENT DOCUMENTS 274426 11/1988 Japan ..................................... 55/267

Primary Examiner—Bernard Nozick
Attorney, Agent, or Firm—Gary A. Samuels

[57] ABSTRACT

A foam-breaking device comprising a heating element enclosed in a synthetic resin membrane.

1 Claim, 2 Drawing Sheets

FOAM-BURSTING DEVICE

FIELD OF THE INVENTION

The present invention concerns a foam-breaking device which can easily burst gas bubbles in liquids and remove the gas components from said liquids without using a chemical defoaming agent. The present invention can be used to remove bubbles from liquids in bioreactors, water-cleaning plants, papermaking plants and alcohol manufacturing processes, etc.

BACKGROUND OF THE INVENTION

In cases where gas bubbles generated in or mixed with treated liquids have harmful effect, e.g., in industries using biological organisms, and in water-cleaning plants, papermaking plants and alcohol intermediate manufacturing processes, etc. defoaming agents have conventionally been added to said treated liquids in order to eliminate or decrease the quantity of said gas bubbles.

When conventional techniques using defoaming agents are employed as described above, running costs are high.

Furthermore, the addition of defoaming agents generally diminishes the detergent effect of surfactants, and causes reactions other than those intended. This is especially true in the case of bioreactors and alcohol intermediate manufacturing processes, etc. In such cases, therefore, the treatment process may become difficult or complicated when defoaming agents are added. Furthermore, the effect of the treatment performed in such a treatment processess is often diminished.

SUMMARY OF THE INVENTION

The present invention is a foam-breaking device comprising a heater element installed inside two layers of synthetic resin membrane which as been made porous so that said membrane is permeable to gases but impermeable to liquids.

The device is set in the liquid (at a prescribed spacing) using the aforementioned porous resin membrane as a support.

As a result of heating by the heater installed as described above, the temperature of the gas in gas bubbles present in the liquid is elevated and the increase in gas pressure alters the surface tension so that the bubbles are burst.

The gas from the burst bubbles is discharged through the pores of the porous synthetic resin membrane so that there is no rise in the internal pressure of the apparatus.

The small porous structure of the membrane prevents the passage of liquids and also prevents the admixture of impurities or invasion of the liquid by saprophytes, etc., from the outside.

BRIEF DESCRIPTION OF THE DRAWINGS

The attached figures illustrate the technical content of the present invention.

In these figures (1) indicates a heater element, (2) indicates connecting conductors, (3) indicates a synthetic resin membrane which has been made porous, (4) indicates non-porous areas, and (5) indicates a heater enclosed by the membrane.

DESCRIPTION OF THE INVENTION

Figure 1:
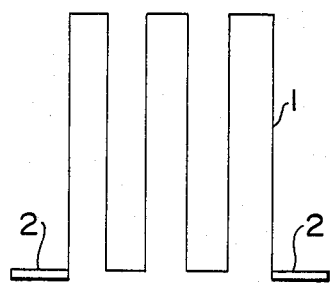
FIG. 1 is a plan view of a heater element used in the present invention.
Figure 2:
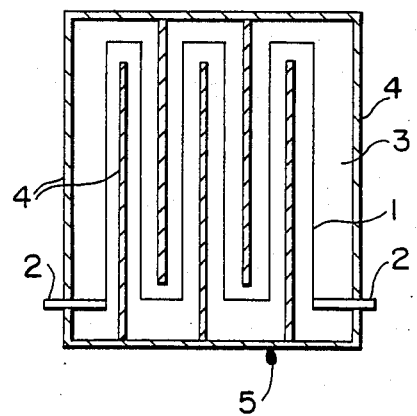
FIG. 2 is a plan view of one example of the heater element on a porous resin membrane.

As is shown in FIG. 1, a heater element or resistance conductor wire (1) is prepared which has connecting conductors (2, 2) at either end, and which forms a meandering heating circuit. As is shown in FIG. 2, heater (1) is mounted on s synthetic resin membrane (3) which as been made porous so that it is impermeable to liquids but permeable to gases. One example of such a porous synthetic resin membrane is a polytetrafluoroethylene membrane with a porous structure, such as is obtained by stretching as described in U.S. Pat. No. 3,953,566. Specifically a film of the aforementioned synthetic resin can be fibrilized by drawing, thus producing a structure in which countless fine fibrils are formed in a spiderweb pattern between numberous micronodes. As a result, membrane material is obtained in which the diameter of the pores formed between the aforementioned fibrils is 1 micron or less; this small pore size acts in conjunction with water-repellent properties of the material itself so that the membrane is permeable to gasses but impermeable to liquids.

The aforementioned heater element (1) is enveloped by being installed between two sheets of such a synthetic resin porous membrane (3), with non-porous portions (4) formed in certain areas. These non-porous portions (4) can be formed by localized fusing of areas originally formed with a porous structure. The non-porous portions (4) formed in this way prevent leakage even in cases where the temperature of the heater (1) drops, so that bubbles contact the porous membrane (3) allowing surfactants, etc., to enter the porous structure.

Figure 3:
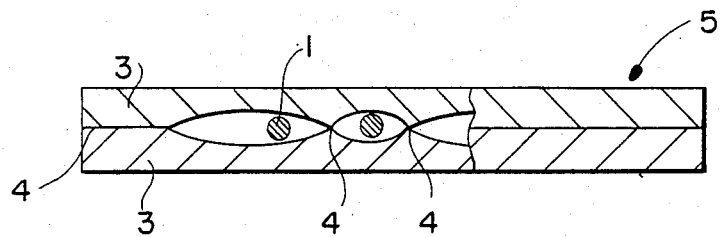
FIG. 3 is cutaway view of partially cutaway section 3—3 of FIG. 2.
Figure 4:
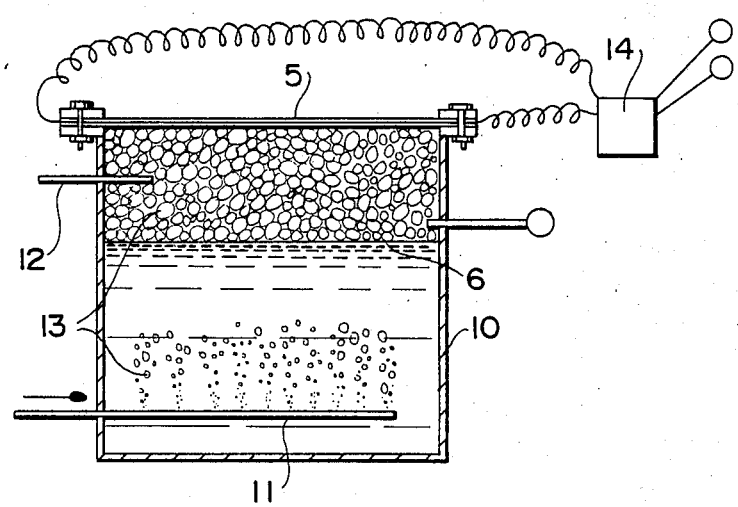
FIG. 4 is a cross section of one example of an apparatus using the device of the present invention.

The bubble-bursting membrane shown in FIG. 3 is preferably formed by (a) sandwiching heater element (1) between two porous polytetrafluoroethylene membranes (3) with a pore size of 0.2 microns, a porosity of approximately 80% and a thickness of 50 microns, and (b) surrounding portions of said heater (1) with non-porous areas (4). This enclosed heater element (5) was installed over the open top of casing (10) as shown in FIG. 4. Water containing a surfactant at a concentration of 1% was placed in the casing; at the same time, a bubbling pipe (11) was installed in the bottom of the casing (10), and air was blown in at a pressure of 1.0 kg/cm$^2$ so that bubbles (13) were generated between the liquid surface and the enclosed element (5). An electric current was passed through the heater element (1) so that heating took place. The temperature was monitored by means of a temperature-measuring means (12), and the foam-breaking performance was evaluated.

A desirable foam-bursting action was observed. Furthermore, in spite of the fact that air was blown in at a pressure 1.0 kg/cm$^2$ as described above, the pressure inside casing (10) was 0.1 kg/cm$^2$; thus, it was confirmed that air from the burst bubbles was effectively discharged to the outside via the porous structure of the aforementioned bubble-bursting membrane (5).

As was described above, the present invention makes it possible to obtain a desirable foam-bursting action without using a defoaming agent, etc. Furthermore, gas discharge is achieved so that a stable foam-bursting effect can be obtained; moreover, the present invention is inexpensive and has an deleterious effect on surfactants or the like.

We claim:

1. A foam-breaking device is characterized by (a) a heater element installed inside two layers of synthetic resin membrane which as been made porous so that said membrane is permeable to gases but impermeable to liquids; said layers being sealed at various places where they are adjacent, such that the heating element is sealed from the environment outside the device.

* * * * *